(12) United States Patent
Goderiaux et al.

(10) Patent No.: US 7,993,694 B2
(45) Date of Patent: Aug. 9, 2011

(54) COOKING APPLIANCE WITH STIRRING MEANS AND ASSOCIATED METHOD

(75) Inventors: Arnaud Goderiaux, Montureux et Prantigny (FR); Jean-Claude Bizard, Fontaine les-Dijon (FR)

(73) Assignee: SEB S.A., Ecully Cedex (FR)

( * ) Notice: Subject to any disclaimer, the term of this patent is extended or adjusted under 35 U.S.C. 154(b) by 322 days.

(21) Appl. No.: 12/162,922

(22) PCT Filed: Feb. 1, 2007

(86) PCT No.: PCT/FR2007/000187
§ 371 (c)(1),
(2), (4) Date: Dec. 16, 2008

(87) PCT Pub. No.: WO2007/088279
PCT Pub. Date: Aug. 9, 2007

(65) Prior Publication Data
US 2010/0028514 A1    Feb. 4, 2010

(30) Foreign Application Priority Data

Feb. 1, 2006 (FR) ..................................... 06 00959

(51) Int. Cl.
*A47J 37/12* (2006.01)
(52) U.S. Cl. .......... 426/438; 426/519; 426/523; 99/348; 99/352; 99/409; 366/304; 366/306; 366/309

(58) Field of Classification Search .................. 426/302, 426/438, 519, 523; 99/348, 352, 403, 409, 99/395; 366/279, 304, 306, 309
See application file for complete search history.

(56) References Cited

U.S. PATENT DOCUMENTS

| 3,547,413 | A | * | 12/1970 | Nunlist | 366/329.3 |
|---|---|---|---|---|---|
| 4,942,807 | A | * | 7/1990 | Wong | 99/348 |
| 5,535,665 | A | * | 7/1996 | Wong | 99/348 |
| 2002/0027175 | A1 | * | 3/2002 | Capp | 241/199.12 |
| 2004/0065211 | A1 | * | 4/2004 | McNair | 99/348 |
| 2005/0223906 | A1 | * | 10/2005 | Xu et al. | 99/348 |
| 2008/0134905 | A1 | * | 6/2008 | Peng | 99/348 |
| 2008/0213447 | A1 | * | 9/2008 | Payen et al. | 426/438 |
| 2010/0303986 | A1 | * | 12/2010 | De' Longhi | 426/438 |

FOREIGN PATENT DOCUMENTS

FR    2871042 A    * 12/2010

* cited by examiner

*Primary Examiner* — Drew E Becker
(74) *Attorney, Agent, or Firm* — Thomas, Kayden, Horstemeyer & Risley, LLP

(57) ABSTRACT

The invention relates to an appliance (1) for cooking food, the appliance comprising firstly a receptacle (2) for containing the food and secondly a blade (8) placed within the receptacle (2), said receptacle (2) and blade (8) being designed to be driven with relative rotary motion so as to stir the food in the receptacle (2), the appliance being characterized in that the blade (8) includes turnover means (13) shaped to act under the effect of the relative rotary motion to cause at least a fraction of the food to turn over in a turnover direction (D) that presents, in the plane of the rotary motion, a majority component that is radial.

30 Claims, 7 Drawing Sheets

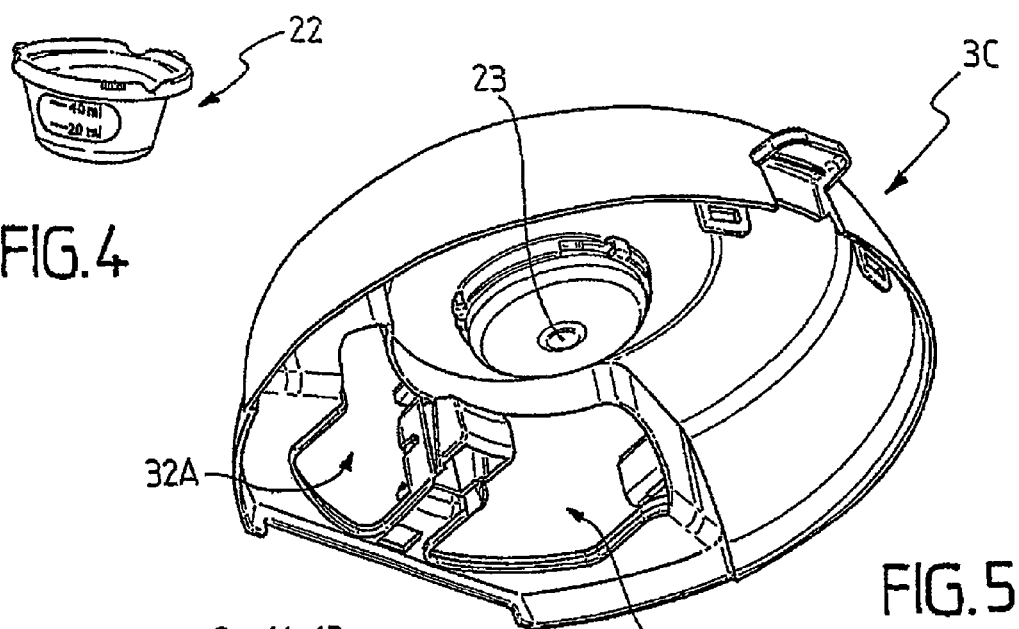
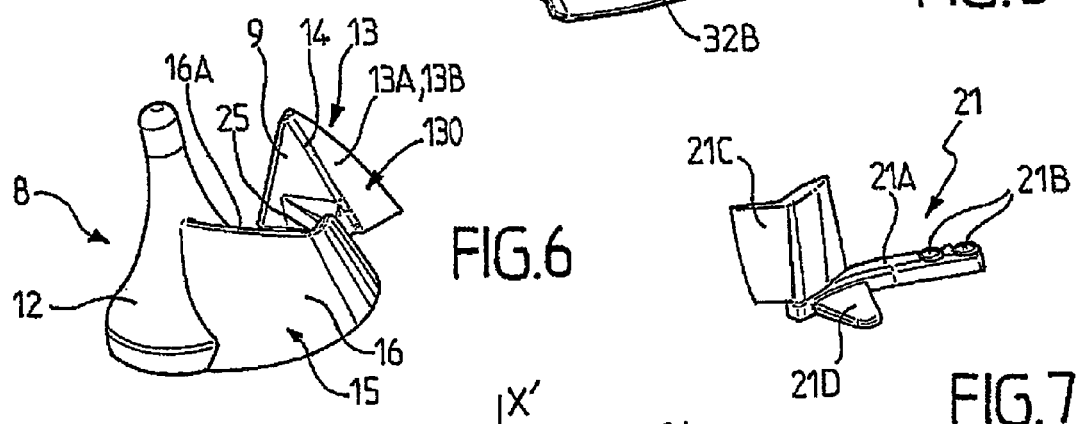
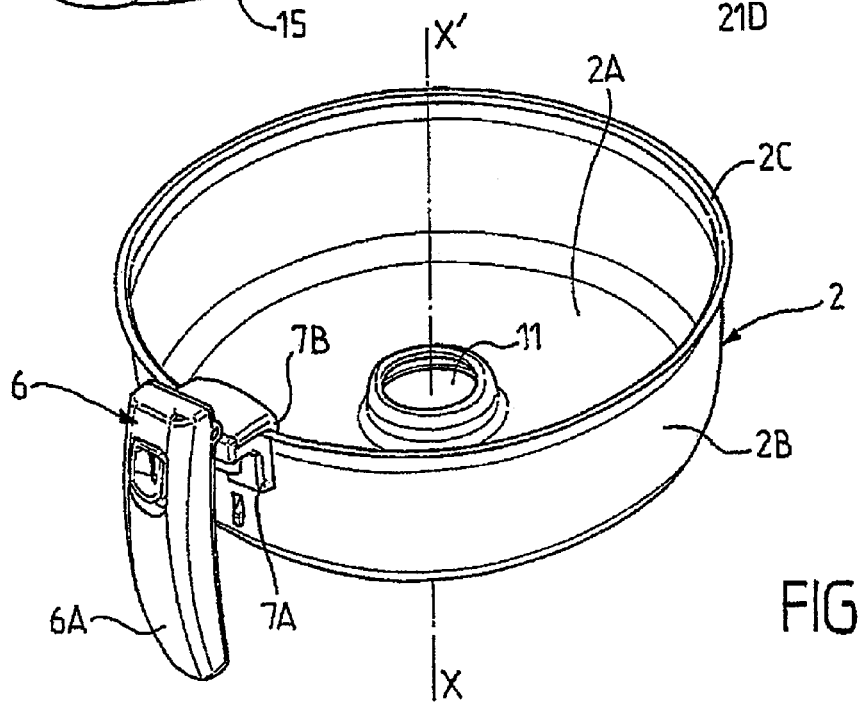

COOKING APPLIANCE WITH STIRRING MEANS AND ASSOCIATED METHOD

CROSS REFERENCE RELATED APPLICATIONS

This application is a national phase of PCT/FR2007/000187 filed Feb. 1, 2007, which claims priority to French Application Serial No. 06/00959 filed Feb. 1, 2006, which is entirely incorporated herein by reference.

TECHNICAL FIELD

The present invention relates to the general technical field of appliances for heating up or cooking food, in particular appliances for home use, and in particular appliances for cooking food in the presence of fat.

The present invention relates to a food cooking appliance comprising firstly a receptacle for containing the food and secondly a blade disposed within the receptacle, said receptacle and blade being designed to be driven in relative rotary motion in order to stir the food in the receptacle.

The present invention also relates to a method of cooking food in which the food for cooking is placed within a receptacle, a blade being installed within the receptacle.

PRIOR ART

Frying food by complete immersion in a bath of oil is well known.

Such frying can be performed, for example, with the help of a household electric deep fryer having both a vessel for filling with oil or fat, and also heater resistance elements for heating the content of the vessel.

Known electric deep fryers thus enable a bath of oil or melted fat to be prepared at high temperature, into which bath the food for frying is plunged, e.g. with the help of a cooking basket.

Although that conventional technique of frying by immersion in a bath of hot oil generally gives satisfaction, it nevertheless suffers from numerous drawbacks.

Firstly, conventional deep fryers make use of a large quantity of oil in order to prepare the cooking bath. That involves handling difficulties for the user when filling the deep fryer, when moving it, and above all when emptying it.

The cooking bath at high temperature also constitutes a risk of burning, whether by spattering out from the vessel of the appliance, or as a result of user clumsiness (tipping the appliance over). This risk of burning or accident is increased by the fact that such a large quantity of oil requires a relatively lengthy pre-heating stage prior to the food being put into the vessel in order to be fried. That can lead the user to forget that the bath of oil is in its pre-heating stage, with all of the harmful consequences that can arise from such a lack of attention.

Furthermore, those known deep fryers turn out to be relatively expensive in use since they require large quantities of oil to be purchased regularly (at least 1.5 liters (L) to 2 L of oil are generally needed to fry 1 kilogram (kg) of pieces of fresh potato). The user is thus naturally tempted to economize on oil by using the same cooking bath several times over, which is not very satisfactory from the points of view of hygiene and of taste. Furthermore, the user might reuse the cooking bath after it has become degraded, and that can be harmful for health reasons. When the user gets rid of used oil, that can have harmful consequences for the environment.

Finally, heating such a quantity of oil to high temperature leads firstly to smells being given off that can be particularly disagreeable, and secondly to the oil polymerizing, which can make the appliance difficult and time consuming to clean.

In order to remedy those drawbacks, it is possible to envisage making do merely with sautéing food in a small quantity of oil that does not allow it to be fully immersed. Under such circumstances, it is nevertheless necessary to ensure that the food is stirred continuously together with the fat so as to coat the food in fat as uniformly as possible and so as to encourage uniform heating of the food as coated in this way, to obtain food that presents a golden and crusty appearance over its entire outer surface.

Naturally, systems are known in the field of cooking for stirring by making use of stirrer blades. Such systems nevertheless turn out to be completely unsuited to mixing food in the form of solid or semi-solid pieces that are relatively fragile, and of consistency that changes as cooking progresses. Known stirrer devices are thus quite simply incapable of performing mixing so as to ensure firstly that the food is uniformly coated in fat (when the presence of fat is required), and secondly that the food is heated uniformly, and without being deteriorated.

SUMMARY OF THE INVENTION

The objects assigned to the invention are consequently to remedy the various drawbacks specified above and to propose an appliance for cooking food that makes it possible to achieve uniform cooking of the food by stirring it while it is being cooked and in a manner that is particularly effective.

Another object of the invention seeks to propose a novel cooking appliance of construction that is particularly simple.

Another object of the invention seeks to propose a novel cooking appliance that makes it possible to impart mixing motion to the food in a manner that is particularly thorough and uniform.

Another object of the invention seeks to propose a novel cooking appliance that enables the food to be stirred effectively independently of the quantity of food.

Another object of the invention seeks to propose a novel cooking appliance of construction that is particularly compact and inexpensive.

Another object of the invention seeks to propose a novel cooking appliance that avoids forming a block of food in which the pieces do not move relative to one another.

Another object of the invention seeks to propose a novel cooking appliance that prevents the food from remaining stuck to the receptacle.

Another object of the invention seeks to propose a novel cooking appliance that imparts motion that is particularly simple.

Another object of the invention seeks to propose a novel cooking appliance that enables french fries to be made without the food being fully immersed in a bath of oil.

Another object of the invention seeks to propose a new method of cooking food that enables the food to be cooked uniformly because of the food being stirred in a manner that is particularly effective.

Another object of the invention is to provide a novel method of cooking food that enables french fries to be obtained that present organoleptic qualities that are close or equivalent to those of french fries obtained by full immersion in a bath of oil, but without making use of such immersion, and while using only a small quantity of fat.

The objects given to the invention are achieved with the help of an appliance for cooking food, the appliance comprising firstly a receptacle for containing the food and secondly a blade placed within the receptacle, said receptacle and blade being designed to be driven with relative rotary motion so as to stir the food in the receptacle, the appliance being characterized in that the blade includes turnover means shaped to act under the effect of the relative rotary motion to cause at least a fraction of the food to turn over in a turnover direction that presents, in the plane of the rotary motion, a majority component that is radial.

The objects given to the invention are also achieved with the help of a method of cooking food in which the food for cooking are placed within a receptacle, a blade being installed within the receptacle, said method being characterized it comprises at least a step i) in which, by establishing relative rotation between the blade and the receptacle, at least a fraction of said food is caused to turn over in a turnover direction that presents, in the plane of the rotary motion, a majority component that is radial.

BRIEF DESCRIPTION OF THE DRAWINGS

Other objects and advantages of the invention appear in greater detail in the following description made with reference to the accompanying drawings, given as illustrative and non-limiting examples, and in which:

FIG. 4 is a perspective view showing a measuring cup forming part of the appliance shown in FIGS. 1 to 3;

FIG. 5 is a perspective view seen from below showing the lid of the appliance shown in FIGS. 1 to 3;

FIG. 6 is a perspective view showing the blade of the appliance shown in FIGS. 1 to 3;

FIG. 7 is a side view in perspective showing a scraper member designed to be releasably mounted on the blade shown in FIG. 6;

FIG. 8 is a perspective view showing the receptacle of the appliance shown in FIGS. 1 to 3;

BEST MANNER OF PERFORMING THE INVENTION

The cooking appliance 1 shown in the figures is preferably a household appliance, i.e. it is specifically designed and dimensioned for home use. Nevertheless, the invention is not restricted to a family context, and it applies equally to semi-professional or professional appliances, and even to industrial installations of the kind used in the food business.

The appliance 1 shown in the figures is preferably for cooking particulate elements, that are in the form of solid or semi-solid pieces, and that are preferably substantially polyhedral in shape, such as potato batons (e.g. for the purpose of obtaining french fries), or such as diced vegetables (e.g. for making pan-fried vegetables).

The appliance 1 is preferably for cooking food in the presence of fat, but cooking without added external fat (other than that contained in the food itself), and even in the absence of any external cooking fluid, comes fully within the ambit of the invention.

The appliance shown in the figures is designed more particularly either to make french fries from potato batons, or else to pan-fry vegetables from diced vegetables. The potatoes or vegetables may be cut into pieces manually by the user, or they may be purchased ready-prepared commercially, either fresh or deep frozen. Nevertheless, the invention is not limited specifically to cooking fried potatoes or pan-fried vegetables. Frying, sautéing, roasting, or more generally heating up any other type of food (including for example meat, fish, shellfish, and fruit) come within the ambit of the invention.

The appliance of the invention comprises a receptacle 2 for containing food (not shown). The receptacle 2 thus forms receiver means designed to accommodate therein food for cooking. Preferably, the receptacle 2 is also designed to accommodate and contain a cooking medium, e.g. in liquid or semi-liquid form, such as fat (oil, butter, etc.). For this purpose, the receptacle 2 is preferably not perforated, i.e. it is substantially solid so as to avoid any fat leaking out therefrom.

Preferably, and as can be seen in the figures, the receptacle 2 has a bottom 2A, preferably substantially in the form of a disk having an axis of symmetry X-X'. From the bottom 2A there rises a side wall 2B between a bottom edge connected to the bottom 2A and a free top edge 2C defining a top opening enabling food to be inserted into the receptacle 2.

The receptacle 2 is thus preferably circularly symmetrical about the axis X-X'.

Figure 1:
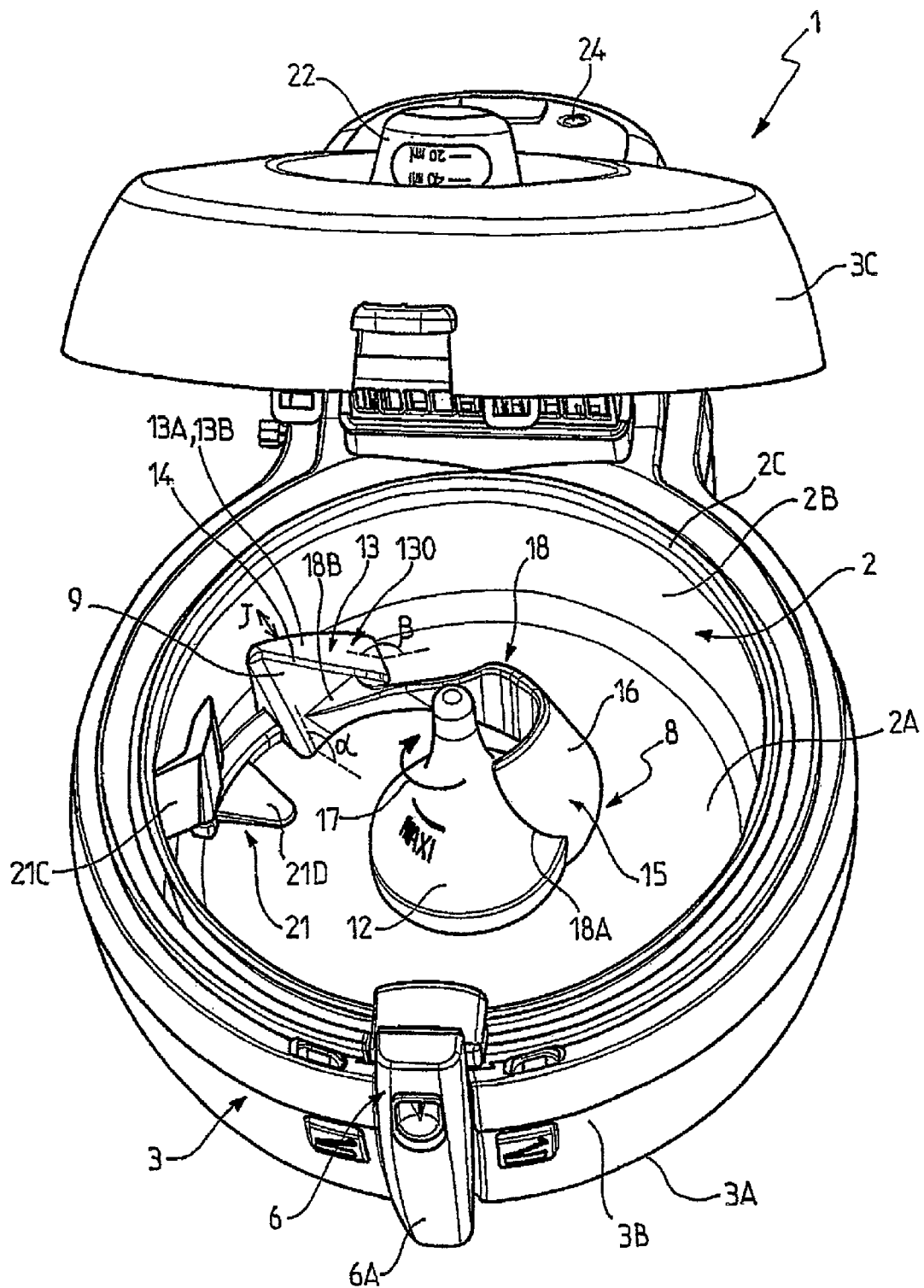
FIG. 1 is a front view looking down, showing the inside of a cooking appliance constituting a first embodiment of the invention.

Advantageously, the appliance 1 has a main body 3 within which the receptacle 2 is mounted, preferably releasably. Preferably, and as shown in particular in FIGS. 1 and 2, the main body 3 comprises a base 3A for constituting the stand of the appliance 1, and shaped for this purpose so as to rest in stable manner on a support or a plane surface.

The base 3A thus defines a bearing face for coming into contact with said support or plane surface, and an opposite face for receiving the receptacle 2, e.g. having support studs 4 projecting from the inside face of the base 3A, and on which the receptacle 2 is designed to rest. From the base 3A and at its periphery, there rises a side skirt 3B, e.g. made of a metal or of a plastics material, and forming the outer casing of the appliance 1. Advantageously, the main body 3 is also provided with a lid 3C mounted to move between firstly a closed position (shown in FIG. 3) in which the lid 3C co-operates with the base 3A and the skirt 3B to form a substantially closed enclosure around the food to be cooked, and secondly an open position (shown in FIGS. 1 and 2), allowing food for cooking to be inserted into the receptacle 2 inside the main body 3. In other words, when the lid 3 is in the closed position, the main body 3 forms a closed vessel, i.e. a vessel that is substantially hermetically sealed, thus enabling cooking to take place in a closed atmosphere. The main body 3 can be closed in substantially sealed manner, e.g. by means of sealing gaskets at the interface between the skirt 3B and the lid 3C. As shown in the figures, the lid 3C is advantageously mounted to pivot relative to the skirt 3B, e.g. via a hinge 5 possibly provided with a torsion spring so that the open position of the lid 3C is also a stable return position. Advantageously, the lid 3C is removably mounted relative to the hinge 5, so as to make it easier to clean.

The food contained in the receptacle 2 can be heated by any known internal heater means (i.e. integrated in the appliance 1), or external heater means (i.e. independent of the appliance 1).

Advantageously, the appliance 1 includes main heater means 3 mounted on the main body 3 and thus integrated in the appliance 1, which main heater means are designed to generate a flow of hot air directed towards the inside of the receptacle 2. The term "main heater means" designates heater means that alone suffice to deliver at least the main part of the heat that enables cooking to take place. Preferably, the main heater means are designed and arranged to deliver all of said required heat.

Advantageously, the main heater means include a fan generating a flow of air by sucking air into the main body 3 via at least one air inlet 30 (visible in FIG. 2), preferably formed to one side of the receptacle 2, and by delivering said air, once heated, via a delivery channel 31 that opens out above and towards the food present in the receptacle 2. Advantageously, the delivery channel 31 comprises two ducts 31A, 31B embedded in the lid 3C, the lid being provided for this purpose with two orifices 32A, 32B complementary to said ducts 31A, 31B. The lid 3C is thus preferably releasably engaged via its orifices 32A, 32B on the ducts 31A, 31B, themselves integrated in the hinge 5.

In order to make it easier to extract and replace the receptacle 2 within the main body 3, the appliance 1 preferably includes a handle 6 designed to be secured to the receptacle 2, either permanently or releasably. In the embodiment shown in the figures, the handle 6 Advantageously comprises both a clamp 7 comprising two jaws 7A, 7B for clamping onto the side wall 2B of the receptacle 2 in order to connect the handle 6 to the receptacle 2, and also a grip member 6A.

Figure 2:
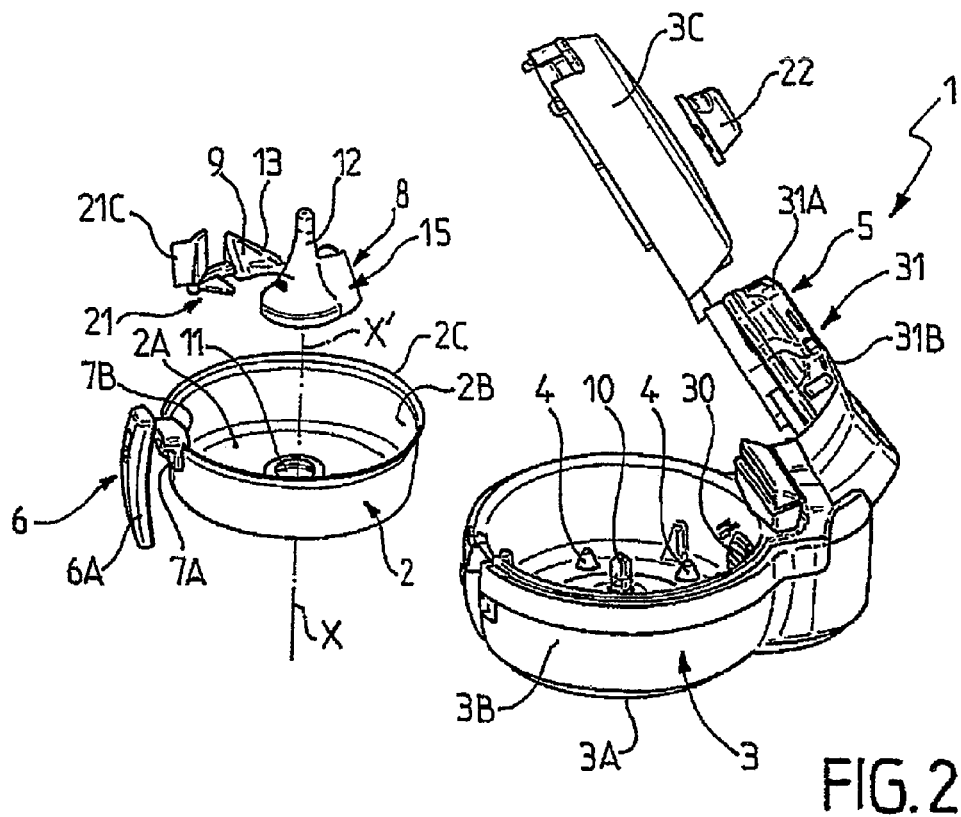
FIG. 2 is an exploded view showing the FIG. 1 appliance.
Figure 3:
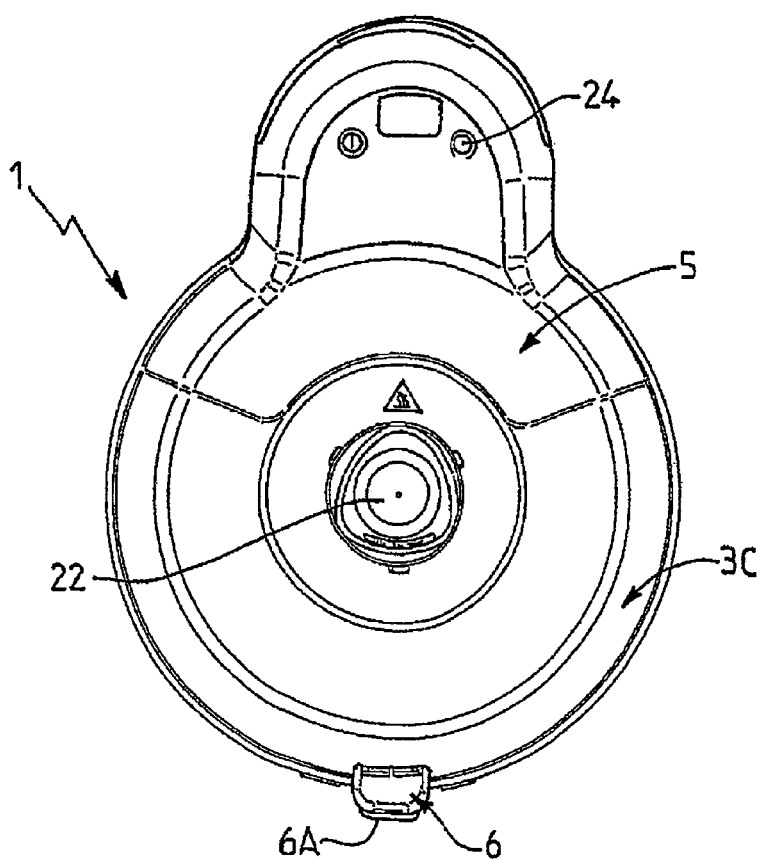
FIG. 3 is a plan view showing the appliance of FIGS. 1 and 2.
Figure 9:
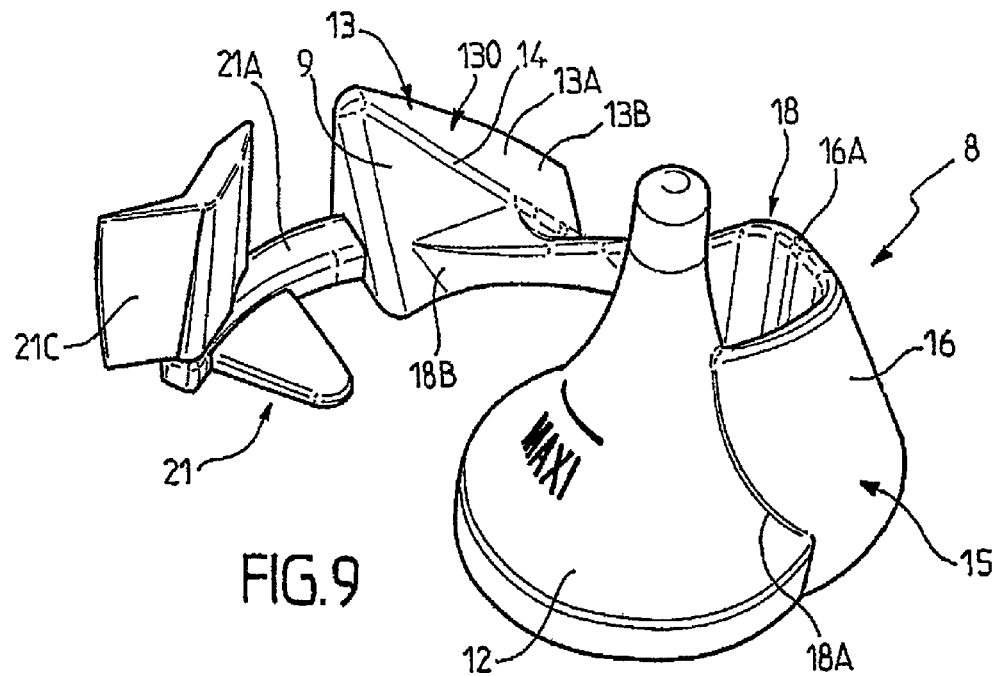
FIG. 9 is a perspective view showing the blade and the scraper member of FIGS. 6 and 7, the scraper member being mounted on the blade.
Figures 10, 11:
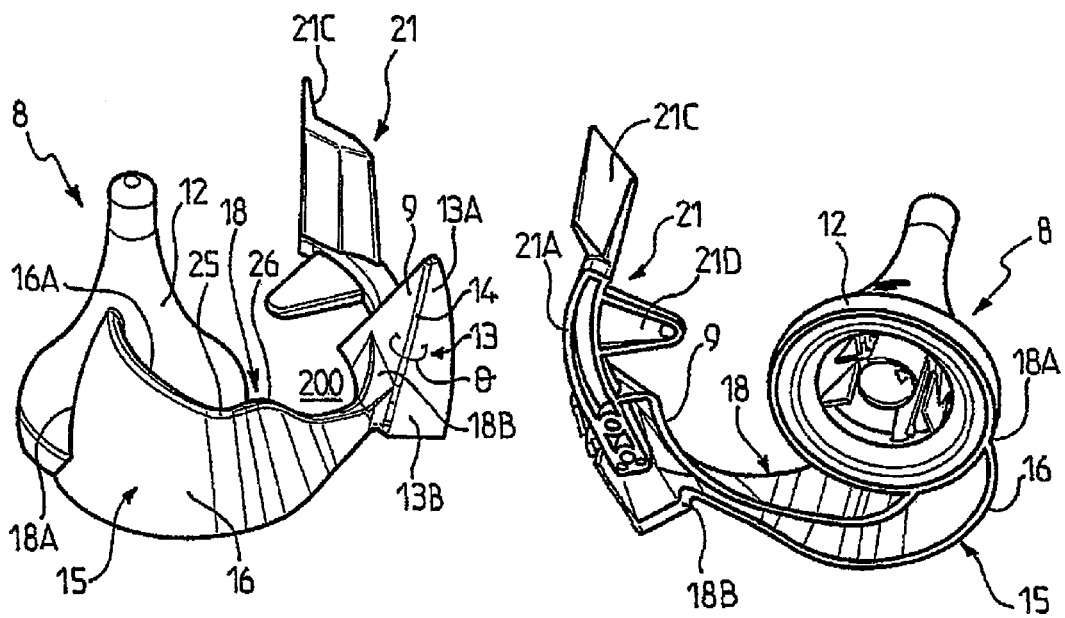
FIG. 10 is a perspective looking down, showing the FIG. 9 assembly comprising the blade and the scraper member.
FIG. 11 is a perspective view seen from below, showing the blade and scraper member assembly of FIGS. 9 and 10.
Figure 12:
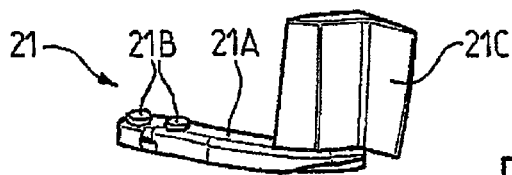
FIG. 12 is a perspective view showing the scraper member of FIGS. 7, 9, 10, and 11, seen from its side opposite to that visible in FIG. 7.

The handle 6 is advantageously designed to pass from a handling configuration (not shown) in which the grip member 6A extends substantially perpendicularly to the side wall 2B, to a storage configuration in which the grip member 6A extends along the side wall 2B (cf. FIG. 2).

As shown in the figures, the appliance 1 also includes a blade 8 disposed within the receptacle 2, i.e. in the inside volume that is to accommodate the food for cooking, and that is defined by the bottom 2A and the side wall 2B. The receptacle 2 and the blade 8 are designed to be driven with relative rotary motion so as to stir the food in the receptacle 2.

In other words, the following configurations come fully within the ambit of the invention:
the receptacle 2 is stationary, while the blade 8 turns inside the receptacle 2, relative to the receptacle;
the blade 8 is stationary while the receptacle 2 turns relative to the blade 8; and
both the receptacle 2 and the blade 8 turn, but at different rotational velocities.

Under the effect of this relative rotary motion, the food is set into motion within the receptacle 2 and thus interacts with the blade 8, thereby stirring the food within the receptacle 2.

In the variants shown in the figures, and that correspond to a preferred embodiment of the invention, the receptacle 2 is mounted stationary within the main body 3, while the blade 8 is mounted to move in rotation relative to the main body 3 and to the receptacle 2.

In other words, in this preferred embodiment, the receptacle 2 is stationary while the blade 8 turns within the receptacle 2. Preferably, in order to achieve this relative movement of the receptacle 2 and the blade 8, drive means (not shown), such as an electric motor, are disposed within the base 3A. The drive means rotate a shaft 10 (visible in FIG. 2). An orifice 11 is formed substantially in the center of the bottom 2A of the receptacle 2 in order to allow the shaft 10 to pass through the bottom 2A. The blade 8 advantageously comprises a hub 12 designed to be fitted, preferably releasably, to the shaft 10 so that the shaft 10 thus rotates the blade 8 within the receptacle 2, the receptacle remaining stationary. In this preferred embodiment shown in the figures, the hub 12 is disposed substantially coaxially about the axis of symmetry X-X' of the receptacle 2 and of the shaft 10, such that the axis of rotation of the blade 8 preferably coincides with the axis of symmetry X-X' of the receptacle 2.

In the invention, the blade 8 includes turnover means 13 shaped to act, under the effect of the relative rotary motion, to turn over at least some of the food present in a turnover direction D that presents, on the plane of the rotary motion, a majority component that is radial. The plane of the rotary motion is the plane perpendicular to the axis of rotation X-X'; in the embodiments shown in the figures, it corresponds to the horizontal plane.

In other words, the turnover means 13 constitute lateral turnover means that serve to turn over food in a direction that extends substantially transversely relative to the travel direction of the blade 8 relative to the receptacle 2. The turnover direction D may coincide with the radial direction, which is naturally defined relative to the rotary motion and to the axis of rotation X-X'. Under such circumstances, the direction D presents a single component, which component is radial. However, and more generally, the direction D presents not only a main component that is radial, but also a minority component that is tangential, such that the movement of the food takes place not in a direction that is purely radial, but in a direction that is essentially radial. Preferably, the turnover means 13 are shaped to act under the effect of the relative rotary motion to turn over said fraction of the food in a turnover direction D that forms relative to the radial direction an angle that is less than or equal to 60°, and preferably less than or equal to 30°.

In the embodiments shown in the figures, on which the description below concentrates, and that corresponds to preferred manner of implementing the invention, the turnover means 13 are advantageously shaped to act under the effect of the relative rotary motion to turn over at least a fraction of the food substantially towards the center of the receptacle 2. In the examples shown in the figures, the center of the receptacle 2 is defined substantially by the axis of symmetry X-X'. Under such circumstances, the turnover means 13 thus serve to turn the food over towards the axis X-X'.

The turnover means 13 are designed to interact with at least a fraction of the food, under the effect of the relative rotary motion, so as to turn said food over. Thus, when the receptacle 2 and the blade 8 are driven with relative rotary motion, zones of the blade 8 forming part of the turnover means 13 become "active" zones acting on the food, i.e. zones capable of exerting force on the food, which force could also merely be a reaction force. It will thus be understood that in the meaning of the invention, the turnover means 13 form preferably a stirring surface, i.e. a surface that acts directly on the food in order to stir it.

Because of the presence of the turnover means 13, and because of the specific shape thereof within the receptacle 2, the food present within the receptacle 2 is returned towards the center of the receptacle 2 on encountering the turnover means 13, which means turn together with the blade 8 within the receptacle 2. Furthermore, the movement of the food towards the center of the receptacle 2 is a turnover movement, i.e. a movement in which each piece of food, while moving towards the center of the receptacle 2 in direction D, is substantially simultaneously subjected to rotation, and in particular rotation about its own axis, preferably about an axis that is substantially parallel to the direction in which the blade 8 is moving relative to the receptacle 2.

In other words, the turnover means 13 are specifically designed to cause pieces of food to be turned upside-down sideways in controlled manner towards the center of the receptacle 2. This turning over thus serves in particular to change the orientation of a given piece of food relative to the bottom 2A of the receptacle 2 during the cooking cycle, thus encouraging cooking to be uniform over all of the faces of each piece of food. The turnover means 13 contributes to forming means for turning pieces of food upside-down. For this purpose, the shape of the turnover means 13 and the speed of relative rotation between the receptacle 2 and the blade 8 are selected so as to enable the food to be turned over radially in the desired manner, and in particular so as to avoid any breaking up of pieces of food or any spattering thereof.

Thus, the turnover means 13 serve in substantially simultaneous manner to move the food towards the center of the receptacle 2 and to turn pieces of food upside-down, thereby serving in particular to change the orientation of each piece of food relative to its surroundings. This specific motion imparted to the pieces of food enables the pieces of food to be well mixed, but without being damaged.

This optimized mixing serves in particular, when fat has been inserted into the receptacle 2 together with the food, to encourage substantially uniform coating of the food in said fat.

This technical provision thus turns out to be particularly advantageous when the appliance 1 of the invention constitutes a dry fryer. The term "dry frying" is used herein to mean a method of cooking food without immersing it in a bath of oil or fat, regardless of whether such immersion is temporary or continuous throughout the cooking cycle. On the contrary, the term "dry frying" means that although the food is indeed "wetted" by a cooking medium (e.g. oil), it is not plunged or soaked in said medium.

In this respect, the principle on which a dry fryer operates is quite different from that of a conventional fryer using a bath of oil.

In the preferred circumstance where the appliance 1 is designed to operate as a dry fryer, the receptacle 2 and the blade 8 then form means for automatically coating the food in a film of fat, preferably a film that is substantially uniform, by mixing said food with the fat.

These means for automatically coating the food in fat turn out to be particularly effective when the blade 8 is provided, as in the present invention, with turnover means 13 encouraging the food to be move towards (or away from) the center, in association with the food being turned about their own axes.

Preferably, the blade 8 is arranged to stir food that is presented in the form of a plurality of pieces of substantially solid consistency and of unit dimension (or caliber) that is of the same order as that of a french fry. In order to avoid any damage to the pieces of food, the blade 8 preferably presents shapes that are rounded, not sharp, enabling the pieces of food to escape before they become jammed and thus avoiding any puncturing or flattening of the pieces of food.

Advantageously, the turnover means 13 have a turnover surface 13A along which said fraction of the food tends to be moved under the effect of the relative rotary motion, said turnover surface 13A presenting an area that decreases going rearwards relative to the travel direction of the blade 8 relative to the receptacle 2, so as to cause said fraction of the food to turn over.

In other words, the turnover surface 13A tapers from upstream to downstream relative to the travel direction of the food against and along said surface 13A, with the taper being sufficient to cause the food to lose support from the surface 13A and consequently to cause said food to turn over.

Figure 17:
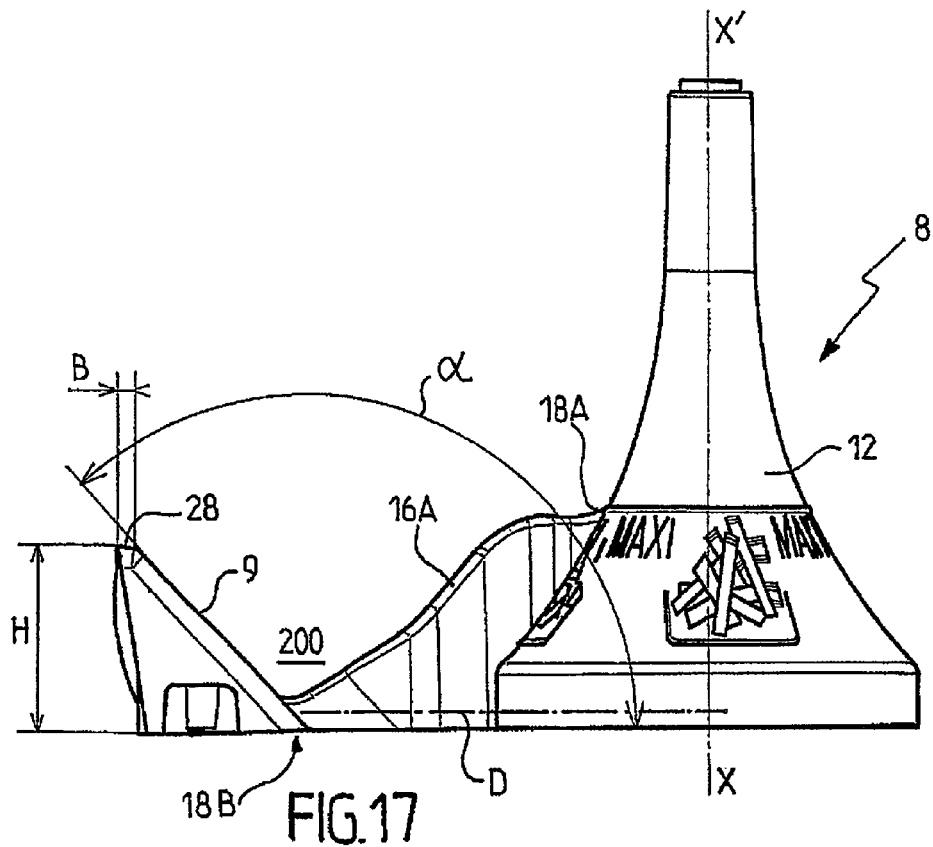
FIG. 17 is an elevation view of the blade shown in FIG. 6.
Figure 18:
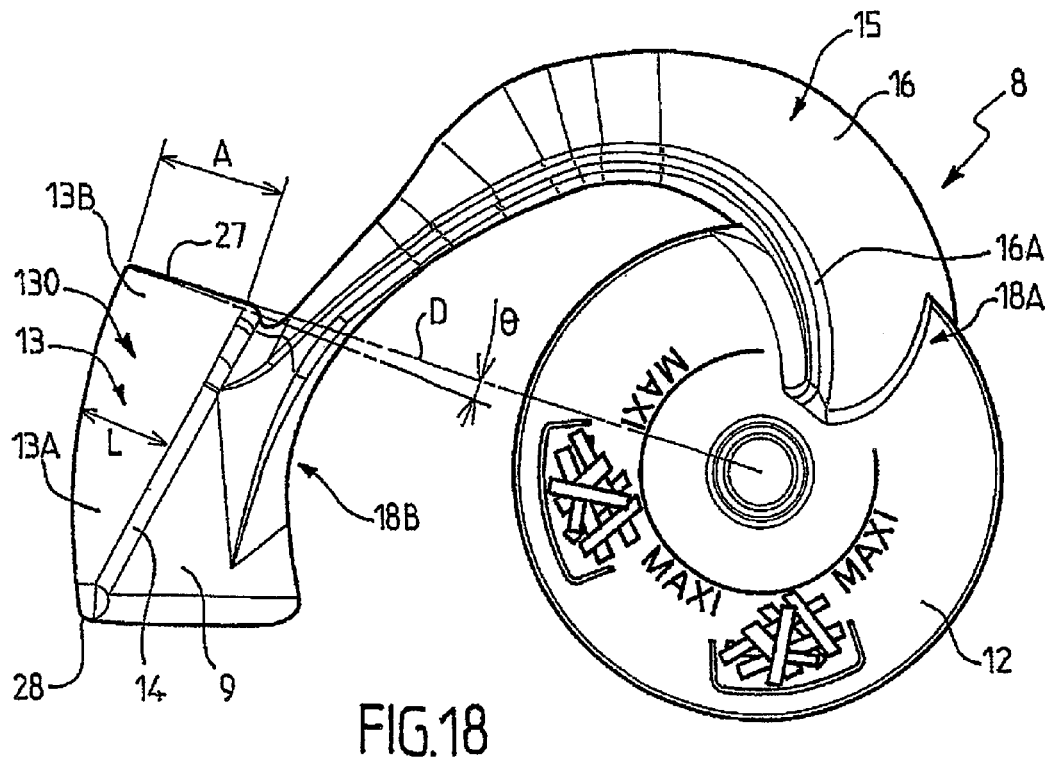
FIG. 18 is a plan view of the FIG. 17 blade.

As shown in particular in FIGS. 17 and 18, the turnover surface 13A is preferably substantially plane in shape, and extends between an upstream edge 27 of width A and a downstream edge 28 of width B, the width A being greater than the width B. The upstream edge 27 corresponds to the leading edge of the turnover surface 13, i.e. the zone that is the first under the effect of the relative rotary motion to engage the food so as to cause it to move along the surface 13A substantially towards its downstream edge 28. The width L of the turnover surface 13A advantageously varies in regular and progressive manner between the magnitudes A and B.

Thus, as it travels along the turnover surface 13A, which surface is preferably situated at a distance from the bottom 2A of the receptacle 2, the food becomes progressively confronted with a lack of support due to the decrease in the width L of the surface 13A, thus leading finally to the food being tipped over sideways and turned over towards the center of the bottom 2A of the receptacle 2A, under the effect of gravity. As shown in the figures, the turnover surface 13A is advantageously positioned so as to be sufficiently close to the side wall 2B of the receptacle 2 to prevent the food from turning towards the periphery of the appliance, thereby causing the food to turn over solely towards the center of the appliance.

Advantageously, the blade 8 also includes lifter means 130 oriented to exert a thrust force with a vertical component on the food in the direction of rotary motion.

Advantageously, the lifter means 130 comprise a lifter surface 13B that slopes rearwards relative to the travel direction of the blade 8 relative to the receptacle 2 so as to provide said lifting of at least a fraction of the food under the effect of the relative rotary motion.

Preferably, and as shown in the figures, the turnover surface 13A and the lifter surface 13B are substantially the same, i.e. a single common surface 13A, 13B performs both of the lifting and the turning over functions.

As shown in the Figures, the lifter surface 13B advantageously forms an inclined slope for lifting the pieces of food under the effect of the relative rotary motion, by a ramp effect. The lifter surface 13B thus advantageously forms means for taking the food away from the bottom 2A of the receptacle 2, thereby increasing the vertical distance between the food being subjected to the action of said lifter surface 13B and the bottom 2A. The lifter surface 13B forms an obtuse angle $\beta$, i.e. an angle of more than 90°, relative to the plane that contains the bottom 2A (or relative to a plane parallel thereto). Preferably, the angle $\beta$ lies substantially in the range 100° to 160°. It has been found that an angle $\beta$ lying in the range 120° to 140°, and preferably substantially equal to 130° makes it possible to optimize the desired food-lifting function.

Advantageously, the top of the lifter surface 13B, which corresponds to an edge 28 (cf. FIG. 18), is situated at a height that is lower than the height of the free edge 20C of the receptacle so as to avoid dirtying the lid 3C while the appliance is in operation.

In order to encourage the food to turn over, it is advantageous to provide a lifter surface 13B of height H (cf. FIG. 17) between its high point and its low point, i.e. between its upstream edge 27 and its downstream edge 28, that lies substantially in the range 0.25 times to 0.9 times the length of a piece of food, when the pieces of food are elongate in shape (as applies to french fries). For example, the height H may lie in the range about 25 millimeters (mm) to 75 mm.

Preferably, the leading edge of the lifter surface 13B, which in the example shown in the figures corresponds to the leading edge of the turnover surface 13A, i.e. the upstream edge 27, is oriented relative to the relative movement between the blade 8 and the receptacle 2 so as to direct the food substantially towards the inside of the receptacle. For this purpose, the upstream edge 27 forms, relative to the radial direction, a reentrant angle θ, e.g. of the order of a few degrees, e.g. lying in the range 1° to 5°, and preferably equal to 3°. This technical provision encourages "fluid" mixing of the food, without food becoming jammed between the lifter/turnover surface 131, 13B and the side wall 2B of the receptacle 2.

Advantageously, and as shown in the figures, the turnover means 13 and the lifter means 130 are arranged relative to each other so as to act under the effect of the relative rotary motion, to lift at least a fraction of the food and then turn said fraction over in said turnover direction D presenting a majority radial component in the plane of rotation. In the embodiments shown in the figures, the turnover means 13 and the lifter means 130 are arranged relative to each other so as to act under the effect of the relative rotary motion, to lift at least a fraction of the food and then turn said fraction substantially towards the center of the receptacle 2. In other words, the single surface constituting both the lifter surface 13B and the turnover surface 13A is shaped to act under the effect of the relative rotary motion, firstly to lift the food by virtue of its sloping ramp shape, and then to deprive the food progressively of support so as to cause it to turn over, as a result of the progressive decrease in width L.

Nevertheless, the invention is not limited to means enabling the food to be subjected to such sequential movement. For example, it is entirely possible within the ambit of the invention to envisage the turnover means 13 and the lifter means 130 being arranged relative to each other in such a manner as to act under the effect of the relative rotary motion and substantially simultaneously to lift at least a fraction of said food and to turn over said fraction in said turnover direction D that presents a majority component that is radial, i.e. substantially towards the center of the receptacle 2, for example. Under such circumstances, lifting and turning over thus take place substantially simultaneously. Such combined motion may be obtained, for example, with the help of a single lifter and turnover surface that presents a twisted shape serving to lift and simultaneously turn over the pieces of food.

It is also possible, without thereby going beyond the ambit of the invention, to envisage the lifter surface 13A and the turnover surface 13B not being the same surface, as in the examples shown in the figures, but being surfaces that are substantially distinct. For example, it is possible to envisage implementing a sloping lifter surface of substantially constant width L, that is extended downstream by a substantially horizontal turnover surface that is of a width that decreases progressively going rearwards, relative to the direction of movement of the blade 8 relative to the receptacle 2. In such a configuration, the food is thus initially lifted up to the turnover surface by the lifter surface, and it is then turned over as it progresses along the horizontal turnover surface of supporting area that decreases going downstream. In such circumstances, the turnover surface is thus situated downstream from the lifter surface from the point of view of the stream of food striking the blade 8.

Advantageously, the blade 8 has a lateral deflector 9 forming a slope extending from the turnover means 13 along said turnover direction D, so that said fraction of the food being turned over under the effect of the turnover means 13 turns over along said lateral deflector 9. In the embodiments shown in the figures, the lateral deflector 9 forms a slope that extends from the turnover means 13 towards the center of the receptacle 2.

Preferably, and as shown in the figures, the lateral deflector 9 comprises at least one sloping surface for accompanying the pieces of food as they turn over. In the elements shown in the figures, the sloping surface preferably extends substantially facing the center of the receptacle 2 so as to direct the food gently towards the inside and towards the bottom 2A of the receptacle 2, in the wake of the blade 8. The lateral deflector 9 thus preferably forms a sloping face against and over which the food drops and turns over sideways, e.g. towards the center of the receptacle 2. The sloping lateral deflection surface preferably forms an obtuse angle α, i.e. an angle of greater than 90°, relative to the plane containing the bottom 2A. Preferably, the angle α lies in the range 100° to 140°. It has also been found that an angle α lying in the range 128° to 134°, and preferably equal to 132° serves to optimize the desired phenomenon of mixing the food.

As shown in the figures, the lateral deflector 9 and the lifter-and-turnover means 13, 130 are joined via a common edge 14. The lateral deflector 9, the lifter means 130, and the turnover means 13 thus form a single piece having two facets, one of the facets corresponding to the lifter and turnover surfaces 13B and 13A, while the other facet corresponds to the lateral deflector 9.

Advantageously, and as shown in the figures, the turnover means 13 and the lifter means 130 are positioned substantially towards the periphery of the receptacle 2, preferably in the immediate proximity of the side wall 2B of the receptacle 2, the turnover means 13 being shaped to act under the effect of the relative rotary motion, to turn said fraction of the food over substantially towards the center of the receptacle 2.

Advantageously, the blade 8 also includes pusher means 15 for pushing the food towards the turnover means 13, under the effect of the relative rotary motion. In the embodiments shown in the figures, the means 15 are preferably designed to push the food towards the periphery of the receptacle 2. In the examples shown in the figures, the means 15 are shaped to move the food centrifugally towards the side wall 2B so as to direct the food towards the lifter and turnover means 130, 13.

Preferably, the means 15 for pushing the food towards the turnover means 13 comprise a front deflector 16 oriented to exert a thrust force on the food in the direction of rotary motion, i.e. along a circular path around the axis X-X' in the variants shown in the figures. In order to encourage the centrifugal movement effect on the food, the front deflector 16 advantageously presents a height in the vertical direction as defined by the axis X-X' that is sufficient substantially to prevent the food from passing thereover. Preferably, and as shown in the figures, the projection of the front deflector 16 onto a horizontal plane (perpendicular to the axis X-X'), presents a profile that is substantially curved rearwards relative to the direction 17 of movement of the blade 8 relative to the receptacle 2. In other words, the front deflector 16 presents a convex leading edge for bringing the food towards the periphery of the receptacle 2. The front deflector 16 preferably presents a leading edge that tapers towards the turnover means 13, i.e., in the examples shown in the figures, a profile tapering rearwards (relative to the direction of rotation of the blade 8 relative to the receptacle 2) and towards the periphery of the receptacle 2, e.g. having a volute shape as can be seen particularly clearly in FIG. 18. The rearward curvature of the front deflector 16 is thus designed firstly to encourage the food to move centrifugally along the deflector 16 when the deflector, as rotated together with the blade 8, strikes the food, and also to avoid creating a clump of food turning as a whole with the blade 8 following a path that is substantially purely circular, without any centrifugal movement.

In a vertical plane, the front deflector 16 preferably presents a profile that is curved upwards and rearwards relative to the direction of rotation of the blade 8 relative to the receptacle 2. This serves, in particular when a large quantity of food is present in the receptacle 2, to encourage effective and fluid mixing of the food.

Advantageously, the means 15 for pushing the food towards the periphery of the receptacle 2 are situated, relative to the direction 17 of movement of the blade 8, in front of the turnover means 13 and the lifter means 130. In other words, the front deflector 16 is situated upstream from the turnover means 13 and the lifter means 130 relative to the flow direction of the food coming into collision with the blade 8 (as seen from the blade), when the blade 8 moves in rotation through the food within the receptacle 2.

The food is thus initially subjected to the centrifugal deflection action of the front deflector 16, which deflects the food towards the periphery of the receptacle 2 until it encounters the lifter surface 130 that raises it, after which it is turned over towards the center of the receptacle 2 along the lateral deflector 9. This very particular motion specific to the invention ensures excellent mixing of the food, guaranteeing cooking that is uniform with the food being covered substantially uniformly by any cooking medium, such as fat (e.g. oil).

Advantageously, the blade 8 has a passage 200 for passing the food, which passage is provided between the means 15 for pushing the food and the turnover means 13. In other words, this passage 200 corresponds to a zone of the blade 8 where it is easier for the food to pass over the blade 8, given in particular the low height of the blade 8 in this zone.

Preferably, and as can be seen in particular in FIG. 17, the means 15 for pushing the food and the turnover means 13 provide between them a notch that corresponds to said passage 200 and that presents, when projected onto a vertical plane, a substantially V-shape, the two limbs of the V-shape corresponding respectively to the lateral deflector 9 and to the top edge 16A of the front deflector 16.

The point where the limbs of the V-shape join is preferably situated close to the lifter and turnover means 130, 13, thus encouraging the turning over of the food while concentrating a maximum amount of food towards said lifter and turnover means 130, 13. For example, the junction point between the limbs of the V-shape is situated substantially in the range ⅗ths to ⅘ths of the distance (corresponding to the "radius" of the blade) between the ends of the blade 8 in a horizontal plane, going from the center towards the periphery of the receptacle 2.

Advantageously, the blade 8 has at least a first arm 18 extending from an inner first end 18A to an outer first end 18B, the inner first end 18A being secured to the hub 12, while the outer first end 18B is secured to the turnover means 13, and preferably also to the lifter means 130. The first arm 18 thus transmits the rotary motion imparted to the hub 12 by the shaft 10 to the lifter means 130 and to the turnover means 13.

Advantageously, the means 15 for pushing the food towards the periphery of the receptacle 2 are secured to the first arm 18, and are interposed between said inner and outer first ends 18A and 18B. The means 15 are preferably directly integrated in the first arm 18, and are made integrally therewith. By means of this technical provision, which corresponds to the first variant embodiment shown in FIGS. 1 to 13, 17, and 18, the blade 8 is particularly simple and compact in construction with a single arm 18 sufficing to perform the essential part of the functions that lead to good stirring.

The blade 8 is thus in the form of a hub 12 from which there extends an arm 18 in the form of a volute, provided at its end with a raised fin having two facets that form the lifter means 130, the turnover means 13, and the lateral deflector 9.

The blade 8 as designed in this way is found to be particularly easy, quick, and inexpensive to fabricate, for example by injection molding a plastics material.

Figure 14:
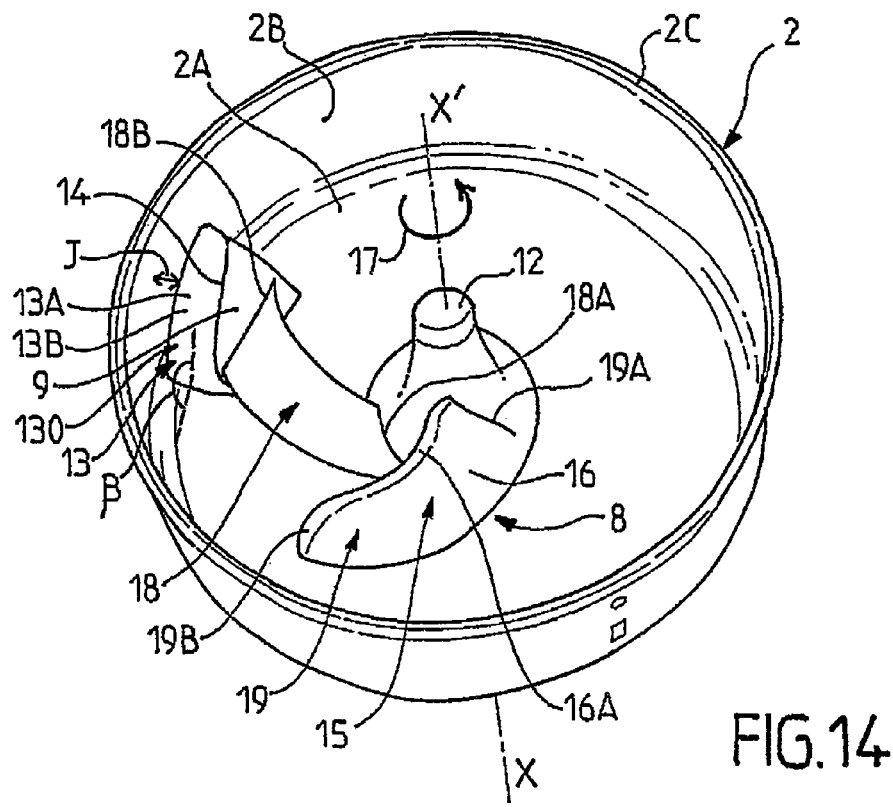
FIG. 14 is a perspective view looking downwards, showing the receptacle and the blade of a cooking appliance constituting a second embodiment of the invention.

In a second embodiment as shown in FIG. 14, the blade 8 may nevertheless include a second arm 19 extending between an inner second end 19A and an outer second end 19B, the inner second end 19A being secured to the hub 12 while the means 15 for pushing the food towards the periphery of the receptacle 2 are secured to the second arm 19 and are interposed between said inner second end 19A and outer second ends 19B. In this embodiment as shown in FIG. 14, the blade 8 thus has at least two distinct arms 18, 19, the second arm 19 being located ahead of the first arm 18 relative to the direction 17 of rotation of the blade 8. The first arm 19 carrying the means 15 for pushing food towards the periphery of the receptacle 2 thus enables food to be taken towards the periphery in such a manner that the food is subsequently subjected to the lifting and turning-over actions as performed respectively by the lifter means 130 and the turnover means 13.

Figure 13:
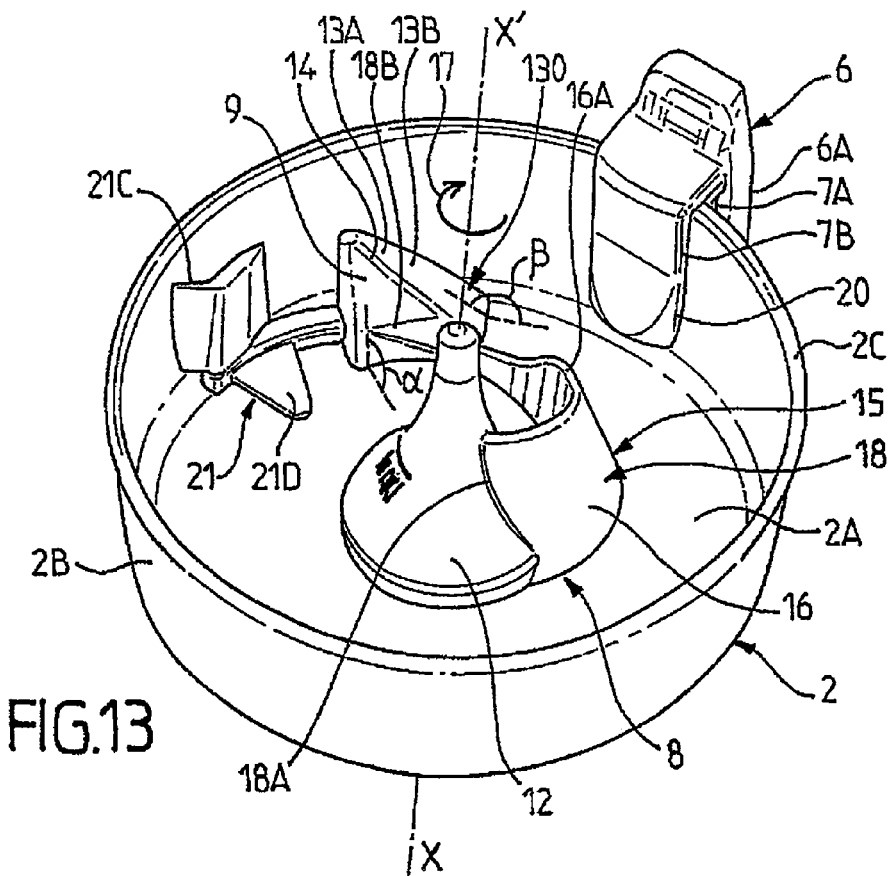
FIG. 13 is a perspective view seen looking downwards, showing the receptacle, the blade, and the scraper member of the appliance shown in the above figures.
Figure 15:
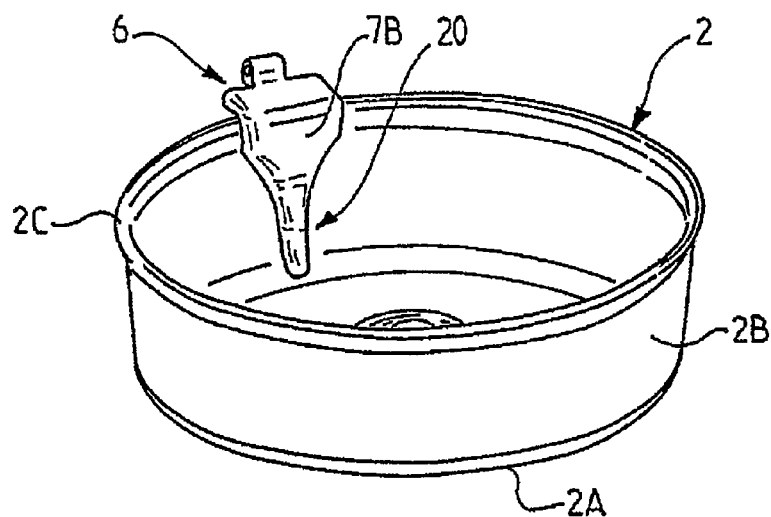
FIG. 15 is a perspective view showing the receptacle of a cooking appliance of the invention fitted with an obstacle for coming into contact with food and preventing pieces of food accumulating against the blade and not moving relative to one another.
Figure 16:
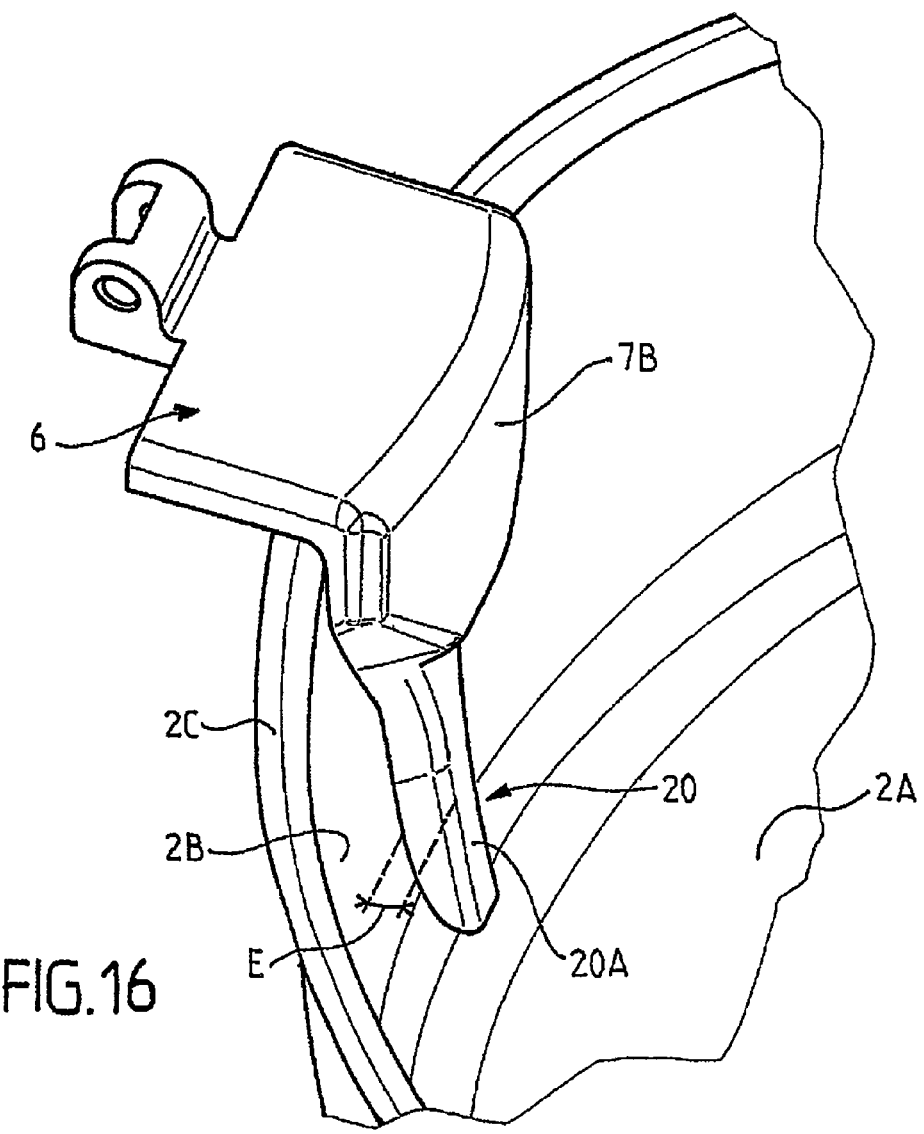
FIG. 16 is a view on a larger scale showing a detail of FIG. 15.

Advantageously, the appliance 1 includes an obstacle 20, and two distinct embodiments thereof are shown respectively in firstly in FIG. 13 and secondly in FIGS. 15 and 16. The obstacle 20 is mounted within the appliance 1 so that the blade 8 is movable relative to the obstacle 20 under the effect of the relative rotary motion, said obstacle 20 being positioned to come into contact with at least some of the food, so as to prevent a clump of food accumulating against the blade 8, the pieces in the clump not moving significantly relative to one another. In other words, the obstacle 20 is placed substantially on the path followed by the pieces of food pushed by the blade 8 under the effect of the relative rotary motion, so as to prevent a compact clump of food moving as a whole and no longer being mixed. The blade 8 is thus movable relative to an obstacle 20 capable of occupying a position close to the turnover means 13 under the effect of the rotary motion of the blade 8 relative to the receptacle 2. The obstacle 20 thus blocks movement of a fraction of the food and consequently facilitates the action of the turnover means 13.

Advantageously, and as shown in particular in FIG. 13, the obstacle 20 is secured to the side wall 2B, inside the receptacle 2. In preferred manner, the obstacle 20 is secured to and more preferably forms an integral part of the handle 6, and more precisely it projects from the second jaw 7B of said handle 6. The obstacle 20 thus projects over a thickness E from the side wall 2B towards the inside of the receptacle 2. Clearance J that is at least slightly greater than the thickness E is provided between the side wall 2B and the blade 8, so as to allow the blade to turn freely without coming into abutment against the obstacle 20.

Using the particular profile of the blade 8 of the invention, it has been found that an obstacle 20 that projects only very slightly from the side wall 2B is sufficient for preventing any compact movement of the food. More precisely, it has been found in the context of the invention that an obstacle 20 presenting a thickness E that is substantially less than the characteristic dimension of the mean thickness of a piece of food enables the desired results to be obtained by preventing any jamming of food against the obstacle 20. Preferably, the thickness E is substantially equal to half the characteristic dimension of the mean thickness of a piece of food. When the appliance 1 is used for cooking french fries, the thickness E is preferably less than the mean thickness of a french fry, so as to avoid french fries becoming jammed behind the obstacle 20 without it being possible for the blade 8 to reach them in order to dislodge them. For example, the thickness E may be substantially less than 5 mm, and more preferably lies in the range 2 mm to 3 mm. This range of dimensions affords an excellent compromise between the obstacle function that is to prevent food from revolving in concert with the blade 8, and the anti-jamming function.

In order to further enhance the anti-jamming, the obstacle 20 which is preferably in the form of a rectilinear finger 20A, extends substantially vertically along the side wall 2B (cf. FIGS. 15 and 16), and preferably presents edges that are rounded, thereby enabling food to escape smoothly, without being damaged.

Advantageously, the appliance 1 also includes a scraper member 21 for sweeping over the side wall 2B under the effect of the relative rotary motion in order to detach any pieces of food that might have stuck to said side wall 2B. Such a scraper member is found to be particularly advantageous when cooking is performed substantially in the absence of any fat, e.g. when cooking pieces of vegetables. In contrast, the scraper member 21 is not absolutely necessary, or is even of no use, when the food comprises pieces of potato that are to become french fries.

In preferred manner, the scraper member 21 is releasably mounted on the blade 8.

For example, and as shown in the figures, the member 21 advantageously includes a tab 21A carrying fastener means 21B, e.g. formed by engagement orifices designed to co-operate with complementary fastener means carried by the blade 8.

The tab 21A is preferably designed to become engaged towards the outer first end 18B of the first arm 18.

Advantageously, the tab 21A carries a flexible scraper flap 21C, e.g. made of elastomer material. The scraper flap 21C presents an outer edge for fitting closely against and sweeping the inside of the side wall 2B when the blade 8 is rotating. In order to stabilize the tab 21A, it is provided with a fin 21D that comes to bear against the bottom 2A, so as to oppose any forces tending to separate the tab 21A from the blade 8 as exerted by the side wall 2B on the flap 21C.

The description above of variants shown in the figures relates to an appliance 1 in which the turnover means 13 are shaped to cause the food to turn over towards the center, and for this purpose the turnover means are preferably situated towards the periphery of the receptacle 2. Nevertheless, without going beyond the ambit of the invention, it is entirely possible to envisage the turnover means 13 being shaped so as to turn food over towards the periphery of the receptacle 2. The invention thus also relates to a food cooking appliance 1 comprising firstly a receptacle 2 that is to contain the food and secondly a blade 8 disposed within the receptacle 2, said receptacle 2 and blade 8 being designed to present relative rotary motion in order to stir food within the receptacle 2, the blade 8 having turnover means shaped to act under the effect of the relative rotary motion, to cause at least a fraction of the food to turn over substantially towards the periphery of the receptacle 2. Under such circumstances (not shown), the turnover means preferably extend close to the center of the receptacle 2. Preferably, as in the variants shown in the figures, the blade 8 has lifter means shaped to act under the effect of the rotary motion to lift at least a fraction of the food, the lifter means themselves also being disposed close to the center of the receptacle 2. The turnover means and the lifter means are preferably arranged relative to each other so as to act under the effect of the relative rotary motion to lift at least a fraction of the food and then to turn said fraction over substantially towards the periphery of the receptacle 2. Under such circumstances, it is also advantageous to provide means for pushing the food towards the center of the receptacle 2, e.g. means presenting a leading edge that is concave.

In other words, in this variant embodiment (not shown in the figures), a configuration is envisaged that is strictly the inverse of that of the variants shown in FIGS. 1 to 14, i.e. the food is initially brought from the periphery towards the center, then it is lifted and substantially turned over towards the periphery of the receptacle. This variant embodiment can thus be considered as being "symmetrical" to the variant embodiments shown in the figures.

To sum up, the invention relates in general terms to a food cooking appliance comprising firstly a receptacle 2 that is to contain food, and secondly a blade 8 disposed within the receptacle 2, said receptacle 2 and blade 8 being designed to present relative rotary motion so as to stir the food within the receptacle 2, the blade 8 having turnover means 13 shaped to act under the effect of the relative rotary motion to turn over at least a fraction of the food laterally, i.e. to move the food with a direction that is for the most part and preferably essentially radial, in combination with causing pieces of food to turn about their own axes that are substantially perpendicular to said movement direction.

The operation of the variant embodiments shown in the figures is described below in greater detail, using by way of example the preparation of french fries from elongate pieces cut from potatoes.

The user begins by lifting the lid 3C giving access to the inside of the main body 3. The user then inserts the receptacle 2 into the main body 3 by placing said receptacle 2 on the support studs 4. The shaft 10 then projects through the orifice 11 in the bottom 2A. The user then puts the blade 8 onto the shaft 10, and more precisely engages the hub 12 of the blade 8 on the shaft 10.

Thereafter, the user pours pieces of potato into the receptacle 2, together with a small quantity of oil. The term "small quantity" is used herein to mean a quantity of oil that suffices to coat the pieces of potato substantially uniformly, as contrasted with a bath of oil in which the pieces of potato would be completely immersed. In order to make it easier to measure out a small quantity of oil, the appliance 1 may also include a measuring cup 22 designed to be releasably fastened on the lid 3C, e.g. and as shown with the help of a bayonet fastener system. Advantageously, the measuring cup 22 can be used as a handle for manipulating the lid 3C when secured thereto.

Advantageously, an orifice 23 may also be provided through the lid 3C for feeding the receptacle 2 with oil. Under such circumstances, oil is fed in when the lid 3C is closed.

Once the food and the fat have been placed within the receptacle 2, and the lid has been closed, the user starts a cooking cycle by pressing on a control button 24 placed on the main body 3.

This has the effect of setting the shaft 10 into rotation, in turn driving the blade 8 in rotation in the direction 17 around the axis X-X'. Under the effect of the blade 8 being set into rotation, the front deflector 16 pushes the food towards the periphery of the receptacle 2, towards the lifter surface 13B which in this example coincides with the turnover surface 13A. The lifter surface 13B then lifts the food until it is no longer supported by the surface 13A, given its reduction in width L. The food then turns over sideways along the lateral deflector 9 towards the center of the receptacle 2. This specific motion imparted to the pieces of potato ensures excellent mixing thereof with the fat so that the pieces of potato can thus be coated in substantially uniform manner with fat.

While being subjected to this mixing, the pieces of potato are also subjected to a flow of hot air coming from the ducts 31A, 31B placed in the hinge 5 and emerging from the lid 3C. The stirring of the food with the help of the blade 8 thus enables the pieces of potato to be cooked uniformly, which pieces are subjected in uniform manner to the flow of hot air.

While cooking is taking place, the pieces of potato pass in succession through the following three stages of consistency:
  raw potato consistency, i.e. they are still moist, sticky, firm, rigid, and not fatty;
  soft consistency of steamed potato, i.e. soft, flexible, slippery, and fragile; and
  fried potato consistency, i.e. rigid, soft center, with an outer crust that is fatty and slippery.

The specific stirring technique of the invention ensures excellent mixing of the pieces of potato in all stages of consistency through which they pass, and does so in a manner that is particularly effective.

At the end of the cooking cycle, the user thus has pieces of potato that present all of the visual and taste qualities of french fries, but that present a fat content that is less than that of conventional cooking by immersion in a bath of oil.

The user then need only extract the receptacle 2 containing the french fries by making use of the handle 6 provided for this purpose.

It should be observed that the stirring technique of the invention ensures excellent mixing independently of the quantity of food present in the receptacle. Thus, when there is a large quantity of food, some of the food will pass over the top edge 16A of the front deflector 16 while the remainder of the food is directed towards the periphery of the receptacle where it is subsequently lifted by the lifter means 130 and then turned over by the turnover means 13.

When there is only a small quantity of food, all of the food will be directed via the front deflector 16 towards the periphery of the receptacle 2 to be handled by the lifter means 130 and the turnover means 13. It has also been found that providing an undulating profile for the top edge 16A of the front deflector 16, as shown in the figures, serves to improve stirring significantly. In particular, it has been found that the profile shown in the figures, where the edge 16A presents a downward slope from the hub 12 down to a low point 25, after which it forms a projection 26 and subsequently again follows a downward slope to the proximity of the bottom 2A is particularly effective.

The description above refers to making french fries out of pieces of fresh potato together with added oil. Nevertheless, the steps described can be applied to pieces of deep-frozen potato, and also to "oven french fries" that are pre-cooked and pre-impregnated with oil. Under such circumstances, there is not necessarily any need to add external oil.

When the user desires to obtain pan-fried vegetables, instead of french fries, the procedure that is to be followed is exactly the same as that described above, except that the user fastens the scraper member 21 onto the blade 8 prior to positioning the blade within the receptacle 2. The scraper member 21 then serves to detach any pieces of vegetable that might become stuck to the receptacle 2.

The invention also provides as such a method of cooking food, preferably at home, suitable for being implemented using the appliance 1 of the invention.

In the method of the invention, the food for cooking is placed within a receptacle 2, a blade 8 being installed within the receptacle 2 for the purpose of stirring the food.

The method of the invention comprises at least one step i), in which, by establishing relative rotation between the blade 8 and the receptacle 2, at least a fraction of said food is turned over in a direction D that presents, on the plane of rotary motion, a majority component that is radial. In the examples shown in the figures, said fraction of said food is preferably turned over the center of the receptacle 2.

Advantageously, the method of the invention includes a step ii) prior to step i), in which said fraction of the food is raised, preferably with the help of the blade 8, as a result of the blade 8 being set into rotation relative to the receptacle 2. In other words, the fraction of the food for cooking is preferably first raised and then turned over.

Advantageously, the method of the invention includes a step iii) in which fat is inserted into the receptacle 2.

In step iii), the quantity of fat added is preferably substantially just sufficient for coating the food without it being immersed in a bath of oil.

Advantageously, step i) and preferably also step ii) is/are advantageously repeated, at least until the food is substantially coated, preferably uniformly, in a film of fat.

The food is preferably in the form of a plurality of pieces presenting a unit size of the order of that of a french fry. Advantageously, the method of the invention thus constitutes a method of preparing french fries.

Nevertheless, it is entirely possible to envisage the method of the invention being applied to obtaining cooked food other than french fries, for example for obtaining pan-fried vegetables, or for obtaining food that has been sautéed, roasted, or indeed cooked without any fat.

Above, there is a description of a method in which the food is moved towards the periphery and then turned over back towards the center.

Nevertheless, it is entirely possible to envisage adopting a "symmetrical" motion. The invention thus also provides a method of cooking food in which pieces of food for cooking are placed within a receptacle 2, a blade 8 being installed within the receptacle 2, and said method comprising at least one step i) in which at least a fraction of said food is turned over towards the periphery of the receptacle 2 by setting the blade 8 and the receptacle 2 into relative rotation.

SUSCEPTIBILITY OF INDUSTRIAL APPLICATION

The invention finds industrial application in the design, manufacture, and use of cooking appliances for preparing or cooking food.

The invention claimed is:
1. An appliance (1) for cooking food, the appliance comprising firstly a receptacle (2) for containing the food and secondly a blade (8) placed within the receptacle (2), said receptacle (2) and blade (8) being designed to be driven with relative rotary motion so as to stir the food in the receptacle (2), the appliance being characterized in that the blade (8) includes turnover means (13) shaped to act under the effect of the relative rotary motion to cause at least a fraction of the food to turn over in a turnover direction (D) that presents, in the plane of the rotary motion, a majority component that is radial.

2. An appliance according to claim 1, in which said turnover means (13) comprises a turnover surface (13A) along which said fraction of the food can be moved under the effect of the relative rotary motion, said turnover surface (13A) presenting an area that decreases going rearwards relative to the travel direction of the blade (8) relative to the receptacle (2), so as to cause said fraction of the food to turn over.

3. An appliance (1) according to claim 2 in which said lifter and turnover surfaces (13A, 13B) substantially coincide.

4. An appliance (1) according to claim 1 in which said blade (8) includes a lateral deflector (9) forming a slope extending from the turnover means (13) along said turnover direction (D) so that said fraction of the food turning over under the effect of the turnover means (13) turns over along said lateral deflector (9).

5. An appliance (1) according to claim 1 in which said blade (8) includes lifter means (130) shaped to act under the effect of the relative rotary motion, to lift at least a fraction of the food.

6. An appliance (1) according to claim 5, in which said turnover means (13) and the lifter means (130) are arranged relative to each other so as to act, under the effect of the relative rotary motion, to lift at least a fraction of said food and then to cause said fraction to turn over along said turnover direction (D) that presents a majority component that is radial.

7. An appliance (1) according to claim 5, in which said turnover means (13) and the lifter means (130) are arranged relative to each other to act under the effect of the relative rotary motion substantially simultaneously to lift at least a fraction of the food and to turn over said fraction in said turnover direction (D) presenting a majority component that is radial.

8. An appliance (1) according to claim 5 in which said lifter means (130) comprise a lifter surface (13B) sloping rearwards relative to the travel direction of the blade (8) relative to the receptacle (2) to lift said at least one fraction of the food under the effect of the relative rotary motion.

9. An appliance (1) according to claim 5 in which said turnover means (13) and the lifter means (130) are positioned substantially towards the periphery of the receptacle (2), the turnover means (13) being shaped to act under the effect of the relative rotary motion, to turn said fraction of the food over substantially towards the center of the receptacle (2).

10. An appliance (1) according to claim 1 in which said blade (8) includes means (15) for pushing the food towards the turnover means (13) under the effect of the relative rotary motion.

11. An appliance (1) according to claim 10, in which said means (15) for pushing the food towards the turnover means (13) comprise a front deflector (16) presenting a leading edge tapering towards the turnover means (13).

12. An appliance (1) according to claim 10 in which said blade (8) includes a passage (200) for the food, which passage is arranged between the means (15) for pushing the food and the turnover means (13).

13. An appliance (1) according to claim 12, in which said means (15) for pushing the food and the turnover means (13) form between them a notch corresponding to said passage (200) and presenting, in projection onto a vertical plane, a substantially V-shape.

14. An appliance (1) according to claim 13 in which the point where the limbs of the V-shape join is situated substantially in the range ⅗ths to ⅘ths of the distance between the ends of the blade (8) in the horizontal plane going from the center towards the periphery of the receptacle (2).

15. An appliance (1) according to claim 1 in which said blade (8) comprises a hub (12) and at least a first arm (18) extending between an inner first end (18A) and an outer first end (18B), the inner first end (18A) being secured to the hub (12) while the outer first end (18B) is secured to the turnover means (13).

16. An appliance (1) according to claim 15 in which said means (15) for pushing the food is secured to said first arm (18) and is interposed between said inner first end (18A) and said outer first end (18B).

17. An appliance (1) according to claim 15 in which said blade (8) includes a second arm (19) extending between an inner second end (19A) and an outer second end (19B), the inner second end (19A) being secured to the hub (12), the means (15) for pushing the food being secured to said second arm (19) and being interposed between said inner second end (19A) and said outer second end (19B).

18. An appliance (1) according to claim 1 and including an obstacle (20) mounted within the appliance (1) so that the blade (8) is movable relative to the obstacle (20) under the effect of said relative rotary motion, said obstacle (20) being positioned to come into contact with at least a fraction of the food, so as to prevent a block of food that is moving substantially as a whole from accumulating against the blade (8).

19. An appliance (1) according to claim 18, in which said receptacle (2) comprises a bottom (2A) from which there rises a side wall (2B), the obstacle (20) being mounted securely to the side wall (2B) inside the receptacle (2).

20. An appliance (1) according to claim 1 in which said receptacle (2) comprises a bottom (2A) from which there rises a side wall (2B), the appliance (1) including a scraper member (21) for sweeping over the side wall (2B) under the effect of the relative rotary motion in order to detach therefrom any food that becomes stuck to said side wall (2B).

21. An appliance (1) according to claim 20, in which said scraper member (21) is mounted removably on the blade (8).

22. An appliance (1) according to claim 1 in which said appliance also comprises a main body (3) within which the receptacle (2) is mounted stationary, the blade (8) being mounted to move in rotation relative to the receptacle (2) and to the main body (3).

23. An appliance (1) according to claim 1 in which said appliance also comprises a dry fryer, the receptacle (2) and the blade (8) forming means for automatically coating the food in a film of fat by mixing said food with the fat.

24. A method of cooking food in which the food for cooking is placed within a receptacle (2), a blade (8) being installed within the receptacle (2), said method comprising the step of i) establishing relative rotation between the blade (8) and the receptacle (2), in which at least a fraction of said food is caused to turn over in a turnover direction (D) that presents, in the plane of the rotary motion, a majority component that is radial.

25. A method according to claim 24, and including at least a step ii) prior to step i), in which said fraction of pieces of food is lifted by imparting relative rotation between the blade (8) and the receptacle (2).

26. A method according to claim 25, and including a step iii) in which fat is inserted into the receptacle.

27. A method according to claim 26, in which, in step iii), a quantity of fat is inserted that is substantially just sufficient to coat the food without it becoming immersed in a bath of oil.

28. A method according to claim 26 in which step i) is repeated at least until the food is substantially coated, preferably uniformly, in a film of fat.

29. A method according to claim 24 in which the food is in the form of a plurality of pieces presenting a unit size of the order of the size of a french fry.

30. A method of cooking food in which the food for cooking is placed within a receptacle (2), a blade (8) being installed within the receptacle (2), said blade including turnover means, said method comprising at least a step i) in which, by establishing relative rotation between the blade (8) and the receptacle (2), at least a fraction of said food is caused by the turnover means to turn over in a turnover direction (D) that presents, in the plane of the rotary motion, a majority component that is radial.

* * * * *